Nov. 11, 1952 | J. M. COOMBS ET AL | 2,617,705
DATA STORAGE APPARATUS
Filed March 25, 1948
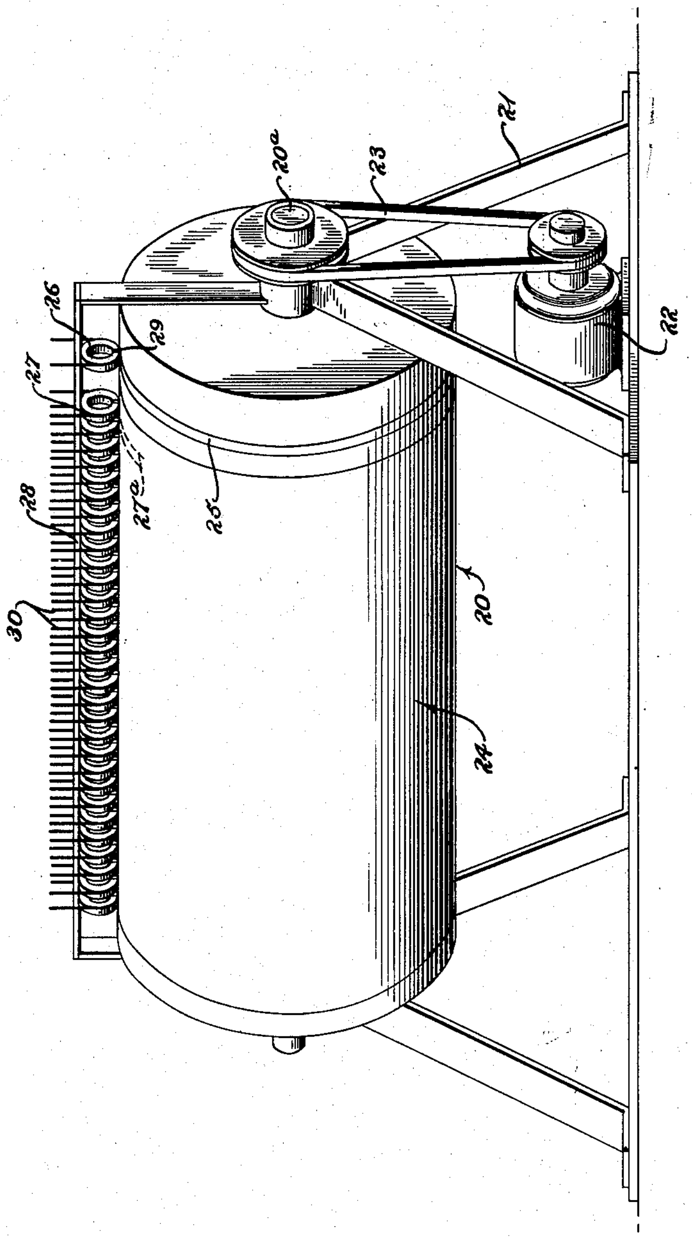
Inventors:
John M. Coombs,
Charles B. Tompkins,
By Cushman, Darby & Cushman
attorneys.

Patented Nov. 11, 1952 2,617,705

UNITED STATES PATENT OFFICE 2,617,705

DATA STORAGE APPARATUS

John M. Coombs, St. Paul, Minn., and Charles B. Tompkins, Washington, D. C., assignors to Engineering Research Associates, Inc., Arlington, Va., a corporation of Minnesota Application March 25, 1948, Serial No. 16,997

2 Claims. (Cl. 346—74)

The present invention relates to data storage apparatus and, more particularly, to apparatus whereby data is magnetically stored.

In numerous lines of endeavor, for example, computing and recording, it is desirable to store certain information for various periods of time and yet have the information readily available for reading or alteration. We have found that by transposing information into electrical pulses and applying these pulses to magnetizable areas of a drum or other member rotatable or movable at high speed, the data will be readily accessible for reading or reproduction.

An object of the invention is to provide a member including a magnetizable area and which member is of such construction that it can be moved at extremely high speed so that data may be recorded thereon, or data read or altered, at high speed.

A rotatable drum having a rigid magnetizable surface is particularly desirable for high speed operation because the stored data is thereby carried by a surface which can move at extremely high speed. One principal objection to previous magnetic storing systems has been that they rely upon tape moving between two reels. A tape driven in that manner will vibrate and break under high speed operation.

A further object of the invention is to provide a structure whereby magnetically stored data will be highly accessible.

Attainment of the last-mentioned object renders the invention particularly important in fields requiring storage of data for long periods and where it is undesirable to maintain a source of power in operation for indefinite periods. Electronic systems for storing data are, of course, open to the objection that the data may be lost by any interruption of the source of power.

Other objects and advantages of the invention will be apparent from the following specification and accompanying drawing.

Referring to the drawing, the numeral 20 designates a signal carrier comprising a rotary drum or moving member suitably mounted in ball bearings upon a support diagrammatically illustrated at 21. The drum is driven by a motor 22, for example, through a belt designated at 23. By way of example, the drum 20 may have a diameter of thirty-four inches and be approximately ten-and-a-half inches wide. The drum is formed of aluminum or other non-magnetizable material. By machining the periphery of the drum after it has been mounted in the journals 21, the eccentricity of the drum may be held to a minimum, for example, an eccentricity of .0007 inch.

The periphery of drum 20 will be covered with magnetic tape 24, for example, iron oxide coated paper tape. The figure illustrates a separate band or track 25 of magnetic tape adjacent one end of the drum for use as a timing locating or synchronizing track. However, the track may be formed integrally with the body 24 of magnetic tape.

Motor 22 may be so connected to the shaft 20*a* that the drum will be rotated at surface speeds ranging from 200 to 1500 inches per second. Generally speaking, the speed of rotation of the drum is limited only by the motor speed because no problem of tape adherence to the drum occurs even at the highest speed just mentioned.

As is diagrammatically illustrated in the drawing, a plurality of magnets 27 will be positioned adjacent the periphery of the drum 20, the magnets 27 being so spaced lengthwise of the drum that each magnet 27 will be opposite a track or band 27*a* of the drum. In this way, each magnet will scan or record upon a drum track of predetermined width. As is shown in the drawing, the magnets 27 will be supported upon a bar 28 suitably secured to the journal bearings of base 21 so that the magnets will be positioned along a line extending parallel to the drum axis, although adjacent magnets may be offset with respect to each other circumferentially of the drum to permit them to cooperate with tracks, bands or paths closely spaced lengthwise of the drum. Each magnet 27 may be adjustably secured to the bar 28 so that its position circumferentially of the drum and the spacing between the periphery of the drum and the magnet can be accurately fixed.

While the drawing illustrates a single magnet for each track of the drum, it will be understood that, if desired, each track may have separate reading, recording and obliterating magnets associated therewith.

Each magnet will be of ring-like form and will include a gap 29 of the order of .003 inch in width. The gap of each magnet will be positioned immediately adjacent the drum periphery, the clearance between the magnet and the drum periphery being of the order of .002 inch.

Entirely satisfactory results have been obtained by having each magnet read, record, or erase a track approximately one-fourth of an inch wide. It will be perceived from this that with a drum ten-and-one-half inches wide, it is entirely practical to provide tracks 27*a* for forty magnets. The cells or areas for signals can be positioned together as closely as fifty to the inch circumferentially of the drum or lengthwise of the tracks 27a. With a drum thirty-four inches in diameter, each track will have a length circumferentially of the drum of 106.8 inches, meaning that each track may include 5,340 cells. Furthermore, with forty tracks, one for each magnet, the entire drum will carry well over 200,000 cells.

With motor 22 rotating drum 20 at such rate that the drum periphery will have a speed of 1,400 inches per second, it will be appreciated that the magnets can scan the drum at the rate of 70,000 cells per second.

The speed of rotation of the drum 20, the number of cells per inch on a track, as well as the rate at which the magnets may scan the drum will obviously determine the time required for access to any desired magnetic cell of the tracks or tapes. By increasing the number of magnets associated with the drum tracks, or the speed of drum rotation, access time will be reduced. Correspondingly, access time may be reduced by making the drum of smaller diameter, although the storage capacity of the drum will also be thereby reduced unless the number of tracks is increased.

As is indicated in the drawing, the magnets 27 may be connected to suitable recording or reading circuits, or to obliterating circuits by leads 30, so that data can be magnetically impressed upon the drum or data upon the drum can be read or obliterated. The track 25 may have a sine wave pattern or other pattern of regular form magnetized thereon and which pattern will act through magnet 26 to enable the cells on the tracks 27a to be located, or signals corresponding thereto synchronized or timed.

A system for the purpose stated in the preceding paragraph is disclosed in the application of Arnold A. Cohen, William R. Keye and Charles B. Tompkins for Data Storage Systems, filed of even date herewith, and now Patent No. 2,540,654, issued February 6, 1951, but it will be understood that other reading, recording and obliterating systems may be used in connection with the apparatus of the present invention.

It will be observed that the provision of a drum provided with a rigid magnetizable surface has the considerable advantage of being movable at speeds of the order mentioned above and without mechanical vibration. As a result, data can be applied to or received from the drum at high speed without danger of misinterpretation or distortion.

The terminology used in the specification is for the purpose of description and not of limitation, the scope of the invention being indicated in the claims.

We claim:

1. A data storage apparatus for high speed operation, comprising, a support, a drum formed of non-magnetic material, the drum being mounted for rotation in the support, the drum being provided with a thin smooth rigid peripheral layer comprised of a magnetizable material, means to rotate said drum in said support at peripheral speeds of at least 200 inches per second, and a plurality of magnetic transducers each having opposed pole pieces which define a transducing gap which is closely spaced from the outer surface of said layer, said transducer gaps each operating in a separate narrow track of the layer by action of fringing flux from the gap to produce longitudinal recording, the arrangement being such the digital information may be both recorded in the tracks of the layer and reproduced therefrom at high access speeds and with strong reproduction signals.

2. A data storage apparatus of the character described in claim 1, wherein the spacing between the opposed pole pieces defining the transducing gap and the outer surface of the magnetic layer is of the order of two-thousandths of an inch.

JOHN M. COOMBS.
CHARLES B. TOMPKINS.

REFERENCES CITED

The following references are of record in the file of this patent:

UNITED STATES PATENTS

| Number | Name | Date |
|---|---|---|
| 1,883,907 | Hathaway | Oct. 25, 1932 |
| 2,213,246 | Heller | Sept. 3, 1940 |
| 2,229,293 | Huntley et al. | Jan. 21, 1941 |
| 2,416,090 | De Forest | Feb. 18, 1947 |
| 2,468,224 | Munson | Apr. 26, 1949 |
| 2,470,839 | Zuschlag | May 24, 1949 |